United States Patent [19]
Fathauer et al.

[11] 3,855,953
[45] Dec. 24, 1974

[54] CONTROLLED POPULATION PLANTER SYSTEM

[75] Inventors: George H. Fathauer, Decatur; Wesley J. Bachman, Mount Zion, both of Ill.

[73] Assignee: Dickey-john Corporation, Auburn, Calif.

[22] Filed: June 18, 1973

[21] Appl. No.: 370,773

[52] U.S. Cl. .................................. 111/1, 111/51
[51] Int. Cl. .............................................. A01c 7/18
[58] Field of Search ............ 111/1, 34, 51; 221/185; 235/95, 98

[56] References Cited
UNITED STATES PATENTS

| | | | |
|---|---|---|---|
| 3,422,776 | 1/1969 | Gregory, Jr. .......................... | 111/1 X |
| 3,537,091 | 10/1970 | Schenkenberg ...................... | 111/1 X |
| 3,723,989 | 3/1973 | Fathauer et al ...................... | 111/1 X |

Primary Examiner—Stephen C. Pellegrino
Attorney, Agent, or Firm—Olson, Trexler, Wolters, Bushnell & Fosse, Ltd.

[57] ABSTRACT

The embodiment of the invention disclosed herein is directed to a controlled population planter system which controls the density of population of seeds delivered from a dispensing hopper to furrows in a field. Seed dispensing means associated with the hopper direct seeds toward the ground and includes seed sensor means for sensing the seeds actually planted to thereby produce a first control signal. A variable drive means is connected to the seed dispensing means for changing the rate at which seeds are dispensed. A speed sensing device is provided for detecting the rate of transport of the vehicle and in response thereto produces a second control signal. The first and second control signals from the seed sensor and speed sensing means, respectively, are applied to circuit means for producing a control signal in response to deviations from preselected conditions in the circuit means. A control device is coupled to the variable speed drive means and to the circuit means for receiving the control signal therefrom, to vary the rate at which seeds are dispensed in accordance with variations in speed of the vehicle over the ground. This allows a constant density of seed population to be maintained regardless of changes in the speed of the vehicle.

7 Claims, 3 Drawing Figures

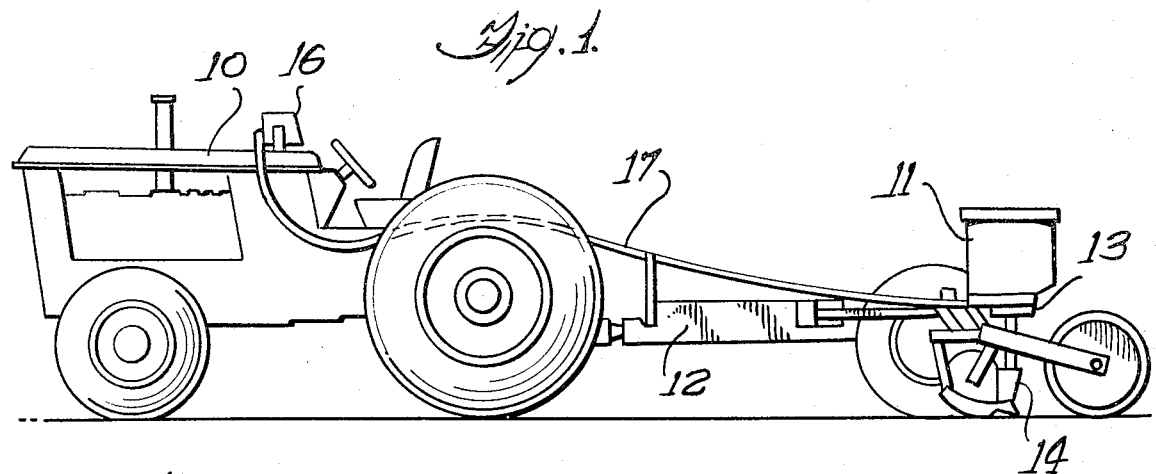
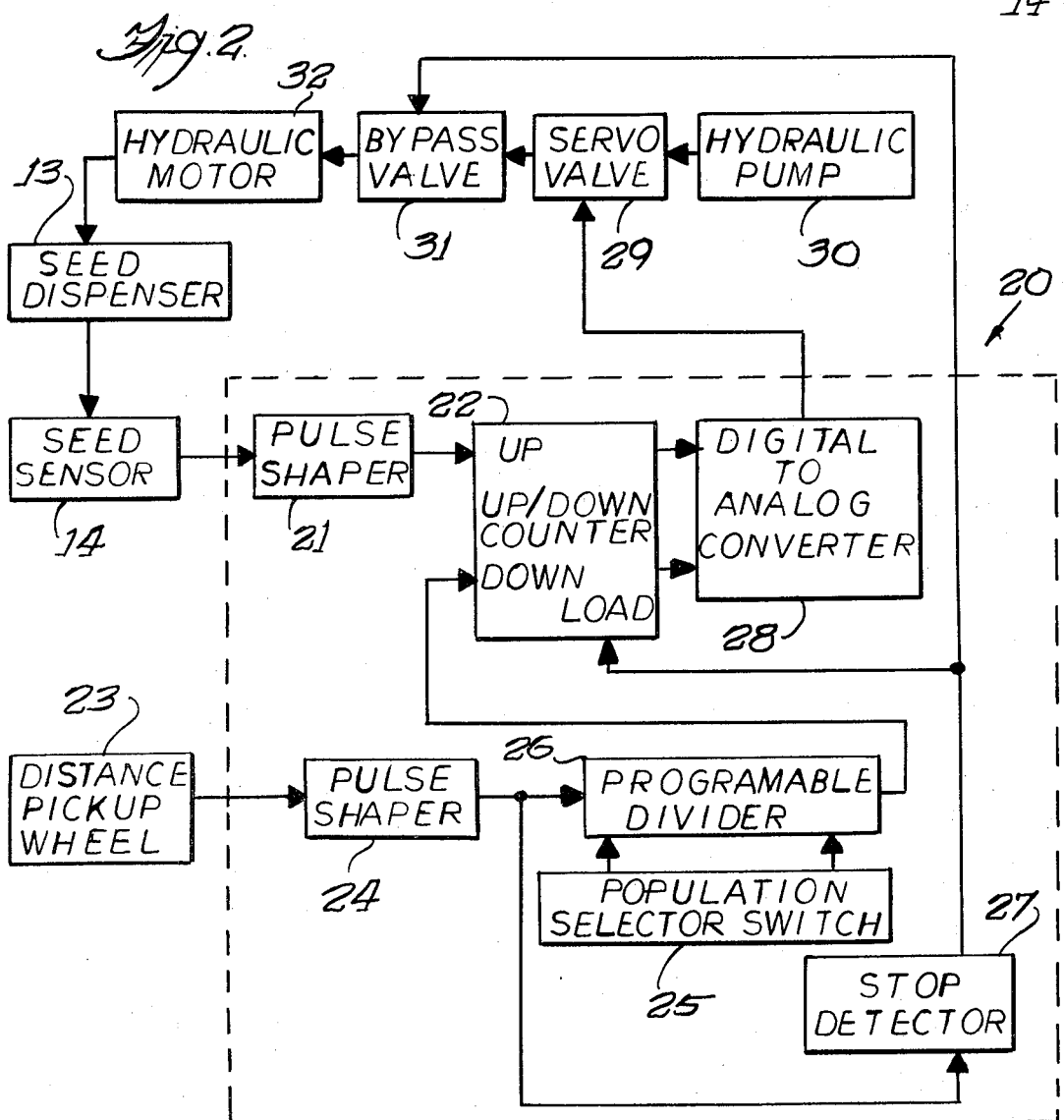

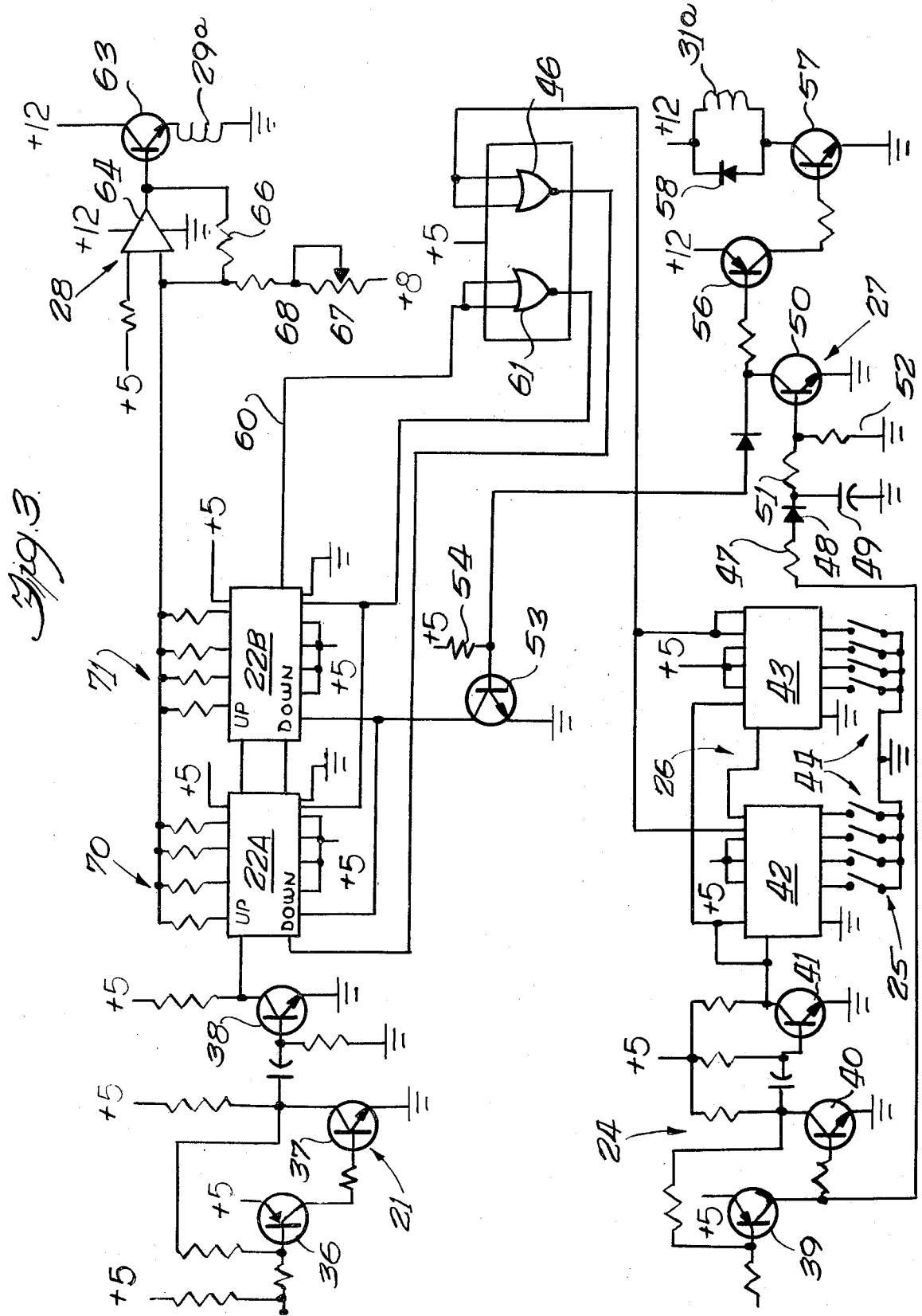

3,855,953

CONTROLLED POPULATION PLANTER SYSTEM

BACKGROUND OF THE INVENTION

This invention relates generally to seed planting systems, and more particularly to a controlled population planter system which automatically maintains a constant density of population of seeds delivered to furrows formed in the ground.

Present day farming techniques include, among other things, the automatic techniques of planting and harvesting crops. The planting of seeds to establish a crop field is often accomplished by driving a tractor, or other suitable vehicle, while pulling a seed dispensing device, preferably several such devices extending transversely of the direction of travel of the tractor, while seeds are continuously dispensed into furrows formed in the ground. These automatic seed dispensing devices are generally driven from drive wheels which are part of the planter. In such prior art automatic seed dispensing devices the rate at which seeds are dispensed can be altered by manually setting the drive coupled to the seed dispenser.

To assure the farmer of a relatively accurate estimate of the number of plants to be expected at the next harvest, the farmer must accurately determine the number of seeds planted during the planting season. To accomplish this in the past the farmer would incorporate a counter device at the seed dispenser of the planter and count the number of seeds being dispensed. During this period of counting, the farmer would either manually or automatically incorporate means to calculate the distance traveled. After traveling a predetermined distance, during which time the seeds have been counted, the farmer can then calculate accurately the density population of seeds for this small area. If the density of population is in accordance with his prescribed yield for that particular field the farmer continues his planting operation without change. However, if adjustment is to be made the farmer must make it at this time and take a second sampling of the number of seeds dispensed during travel of a prescribed distance. While being somewhat of an automatic system for planting of seeds this arrangement has the disadvantage in requiring substantial amounts of time for setup and checking before a continuous long run of planting can be commenced.

SUMMARY OF THE INVENTION

It is an object of this invention to provide a new and improved controlled population planter which automatically makes changes in the number of seeds dispensed in accordance with the variables of dispensing seeds actually planted and detecting the speed of the tractor over the ground.

Another object of this invention is to provide a controlled population planter system wherein the desired density of seed population is selected without the need of sample runs over the intended planting field, and wherein the density of population can be altered from time to time as desired.

Another object of this invention is to provide a new and improved controlled population planter system which is efficient and reliable in operation and, particularly from a user's standpoint, extremely simple to operate.

Briefly, this invention incorporates means for automatically varying the rate at which seeds are dispensed in accordance with signals produced as a result of sensing both the actual number of seeds being planted and the actual rate of travel of the tractor over the ground. By so controlling the operation of the seed dispensing mechanism in response to these two variable conditions a very accurate density of seed population throughout the entire planting area is automatically maintained.

BRIEF DESCRIPTION OF THE DRAWINGS

FIG. 1 is an elevational view showing a tractor pulling a seed planting hopper and illustrates the various components necessary to operate a controlled population planter in accordance with this invention;

FIG. 2 is a simplified block diagram of the controlled population planter system of this invention; and FIG. 3 is a detailed schematic diagram of the portions of the block diagram within the area of the dotted lines of FIG. 2.

DETAILED DESCRIPTION OF THE ILLUSTRATED EMBODIMENT

Referring now to FIG. 1 the basic components of the controlled population planter system of the present invention are illustrated. Here a tractor 10, or any other suitable vehicle, is utilized to transport a hopper 11, or a plurality of such hoppers extending transversely of the tractor's direction of travel, over a field to be planted. The connection made between the tractor 10 and hopper 11 can be of any suitable arrangement, here being illustrated by means of a tow bar 12 which may include rotary shaft means and hydraulic pump means for operating hydraulically driven motors associated with the dispensing portion of the hopper 11. Positioned at the lower portion of the hopper 11 is a seed dispensing mechanism which directs the seeds to be planted downwardly into furrows, or the like, formed beneath the hopper. The seed dispensing mechanism can be operated by a variable speed drive means such as a variable speed hydraulic motor or the like. Immediately beneath the seed dispenser 13 is a seed sensor 14 which produces an electrical signal, preferably in the form of a pulse signal, for each seed actually passing therethrough. The electrical signal generated is in response to seeds actually dispensed. Mounted on the tractor 10, in any convenient location, for manipulation and observation by the tractor operator, is a control and monitor unit 16 which is coupled to the seed dispenser and seed sensor devices through a control cable 17.

In operation, the farmer need merely start the tractor, set desired information into the control unit 16 as to the density of population of seeds desired, and then pull the hopper or hoppers behind the tractor at any desired speed. The rate of movement of the tractor over the ground is detected by any suitable means, but preferably by means for producing pulse signals corresponding to incremental distances traveled, and these pulse signals are delivered to the control and monitor unit 16 for comparison with control signals generated by seed sensor 14. These two signals are then used to control the rate of operation of the seed dispenser 13 thereby automatically maintaining a desired density of seed population over the field being planted without regard to variations in speed of the tractor. Also should the number of seeds being planted vary as a result of changes in rate of operation of the device controlling the seed dispensing, or a malfunction of the dispensing device, a corresponding control signal will be developed to vary the operation of the seed dispenser so that a constant density of population is maintained.

Referring now to FIG. 2 the basic details of the components of the control population planter system are shown and here designated generally by reference numeral 20. The controlled population planter system 20 has the seed sensor 14 thereof coupled to a pulse shaper circuit 21. In the preferred embodiment of this invention, the seed sensor 14 includes a photoelectric sensor which produces a pulse output as a result of each seed passing therethrough. The seed pulse from pulse shaper circuit 21 is then applied to circuit means which includes an up-down counter 22, this connection being made to the up count portion thereof. The distance covered by the planter is detected by a distance pick-up device 23, it being understood that any suitable distance measuring device can be used to apply an output signal thereof to a pulse shaper circuit 24. The distance pickup device 23 may include a distance-measuring wheel having a pulse-producing device connected thereto to generate a single pulse for each predetermined increment of distance traveled. For example, the pulse-producing device can be a reed switch actuated by a magnet or magnets associated with the distance wheel. The distance pulses are then processed by programmable divider circuit means 26 and fed to the down portion of the up-down counter circuit 22. The desired density of population is selected easily by means of the population selector switch 25. When the planter first begins to move a stop detector circuit 27 changes state, thereby allowing the up-down counter to begin counting. The digital output signal from the up-down counter 22 is converted to a DC voltage by means of a digital-to-analog converter circuit 28.

The digital-to-analog converter 28 includes control means which are responsive to control signals developed at the output of the up-down counter 22. The control signal developed at the output of the digital to analog converter 28 is used to control the operation of a servo valve mechanism 29. This servo valve mechanism regulates the flow of hydraulic fluid from a hydraulic pump 30 through a bypass valve 31 to a hydraulic drive motor device 32. The hydraulic drive motor device functions as a variable speed drive mechanism to operate the seed dispenser 13 at a selected rate so that the number of seeds dispensed within a particular time interval is accurately controlled.

If the two inputs to the up-down counter match one another one-for-one the counter remains at its middle position and the control output voltage of the analog-to-digital converter remains constant to thereby maintain the speed of operation of the hydraulic drive motor at a given setting of seed delivery. If the seed rate begins to decrease due to planter malfunction, or for any other reason, while the distance pulse rate remains constant, the distance or down pulses exceeds that of the seed or up pulses and the counter shows a net down count. The digital-to-analog converter 28 then produces a control voltage variation which opens the servo valve 29, thereby increasing the speed of the hydraulic motor 32 to maintain the selected rate at which seeds are planted. When the seed signal rate is sufficient to return the counter inputs to a one-to-one ratio, the system is again balanced and the hydraulic motor speed remains constant.

If the distance pulses cease, as a result of the tractor stopping, the stop detector circuit 27 changes state and causes the bypass valve 31 to prevent further fluid flow to the hydraulic motor 32. This is necessary because the servo valve 29 can not close completely and allows the motor to creep a slight amount which would cause seeds to be planted while the tractor is stopped. The output of the stop detector circuit 27 is also connected to the up-down counter 22 to cancel the output thereof when the tractor is stopped.

In accordance with the present invention the electronic portion of the controlled population planter system produces an output voltage whose amplitude changes as the seeds per unit area, i.e., density of population, changes. This output voltage could be used to control many types of mechanical or electrical drive mechanisms in addition to the hydraulic drive system shown here.

Referring now to FIG. 3 a detailed schematic diagram illustrates substantially that portion of the control system 20 located within the broken lines of FIG. 2. The reference numerals in FIG. 3 which correspond to the reference numerals of FIG. 2 are directed toward that portion of the block diagram which corresponds to the electronic components. The seed pulse shaper circuit 21 consists of transistors 36, 37, and 38, the last of which is direct current coupled to the upper portion of the up-down counter 22. In FIG. 3 the up-down counter is illustrated as being formed of two integrated circuit elements designated by reference numerals 22A and 22B. The distance pulses are shaped by the pulse shaper circuit 24 which comprises transistors 39, 40, and 41 connected to the input of the programmable divider network 26. Here the programmable divider network includes a pair of independent integrated circuit components 42 and 43 which are controlled by a plurality of selector switches 44 which, in turn, function as the density population selector switch 25 of FIG. 2. The output of integrated circuit portion 43 is inverted by a gate circuit 46 and delivered to a second input portion of the up-down counter 22, this being the portion 22A in particular.

The stop detector circuit comprises a series connected resistor 47 and a diode 48 which deliver pulse signals to one end of a capacitor 49 which, in turn, has its other end thereof connected to ground potential. Capacitor 49, in turn, is connected to the base electrode of a transistor 50 through a resistor 51. As capacitor 49 charges through resistor 47 and diode 48 it will bias the transistor 50 in an on condition when pulses corresponding to the distance of travel of the tractor are obtained. If the distance pulses are lost, capacitor 49 discharges through a resistor 52 and transistor 50 is thereby turned off. The turning off of transistor 50 renders a transistor 53 conductive as a result of bias potential applied to the base electrode thereof through a resistor 54. During normal operating conditions, i.e., when distance pulses are received, transistor 53 is maintained nonconductive as a result of ground potential applied to the base electrode thereof when transistor 50 is conductive. However, conduction of transistor 53 applies ground potential to load input terminals associated with the integrated circuit portions 22A and 22B which will set the up-down counter to the middle of its range. When transistor 50 is rendered nonconductive it turns off a transistor 56 which, in turn, renders transistors 57 nonconductive to deenergize the holding coil 31a of the bypass valve 31. Connected in parallel with holding coil 31a is a diode 58 which is used to suppress transients and to prevent high voltage spikes which may be produced in the holding coil 31a from damaging transistor 57.

A borrow output line 60, from integrated circuit portion 22B is delivered to an inverter circuit 61 and coupled back to the clear inputs of the up-down counters. If distance pulses exceed seed pulses sufficiently to force the counter all the way to zero, the clear pulse applied thereto will prevent the next down pulse from moving the counter to a full count and closing the servo valve operated from the output thereof. The servo valve 29, of FIG. 2, is energized as a result of conduction of a transistor 63 which has the base electrode thereof connected to the output of an operational amplifier 64. The operational amplifier 64 together with its feedback resistor 66, series connected adjustable resistance element 67 and fixed resistance element 68 form part of the digital-to-analog converter circuit 28.

The digital outputs from the up-down counter portions 22A and 22B are connected through a plurality of resistors forming two groups, 70 and 71, and whose values are selected according to the significance of their respective digits. These resistor groups form part of the digital-to-analog converter arrangement. Thus, the current into operation amplifier 64 varies in proportion to the count stored in the up-down counter. The output value of the operational amplifier 64 controls the amount of drive signal applied to the servo valve through the buffer amplifier transistor 63.

What has been described is a simple and efficient means for substantially, completely, and automatically controlling the operation of a population planter system whereby the density of population over a given area is maintained constant regardless of variations in rate of seed dispensing or rate of travel of a tractor over the ground surface. The system disclosed herein has the added advantage in that during start-up and stopping of the tractor, which occurs from time to time under normal operating conditions, the density of seed population is accurately controlled, thereby preventing overcrowding or thinned areas from occurring in the planted field.

Accordingly, variations and modifications may be effected without departing from the spirit and scope of the novel concepts disclosed and claimed herein.

The invention is claimed as follows:

1. In a controlled population planter system, the combination including: a hopper for containing a quantity of seed, said hopper adapted to be connected to a vehicle for transport over the ground, a seed dispensing means associated with said hopper for planting the seeds as the hopper is transported over the ground, variable speed drive means, coupled to said seed dispensing means, seed detector means connected to said seed dispenser means for producing a first signal which corresponds to the number of seeds actually dispersed, distance measuring means for producing a second signal which corresponds to a predetermined distance travelled by said hopper over the ground, circuit means for receiving said first and second signals and producing a control signal in response thereto, selector means coupled to said circuit means for setting a predetermined seed population per unit area of ground over which said hopper is transported, and control means, coupled to said variable speed drive means and to said circuit means for receiving said control signal therefrom, said control means adapted to vary the speed of said variable speed drive means in response both to changes in the number of seeds actually planted and to variations in the rate of sensing said second signals from said distance measuring means, whereby a substantially desired density of seed population is maintained in accordance with the setting of said selector means.

2. The controlled population planter system according to claim 1, wherein said circuit means includes up-down counter circuit means, a first circuit portion thereof receiving said first signal and a second circuit portion thereof receiving said second signal, and said control signal being substantially in accordance with the setting of said selector means until such time as a difference signal exists between said up-down counter circuit means and said selector means.

3. The controlled population planter system according to claim 1, further including stop circuit means for detecting the absence of said second signal, said stop circuit means being coupled to said circuit means for stopping operation of said variable speed drive means to cease further dispensing of seeds when the vehicle is stopped.

4. The controlled population planter system according to claim 1, wherein said variable speed drive means includes a hydraulic pump, a servo valve connected to said hydraulic pump, a bypass valve connected to said servo valve, and a hydraulic motor operatively connected to said hydraulic pump through said bypass valve and said servo valve, and wherein said control means is coupled to said servo valve for controlling the rate of operation of said hydraulic motor.

5. A control system for a seed planter having seed dispensing means including adaptable speed means therefore, for varying the rate of seed discharge from the dispensing means movable across a area to be planted, a hopper for containing a quantity of seed, said seed control system comprising seed detector means connectable to said seed dispenser means for producing a first signal which corresponds to the number of seeds actually dispensed, distance measuring means for producing a second signal which corresponds to a predetermined distance travelled by said dispensing means over the ground, circuit means for receiving said first and second signals and producing a control signal in response thereto, selector means coupled to said circuit means for setting a predetermined seed population per unit area of ground over which said dispensing means is transported, and control means adapted to be coupled to said adjustable means and coupled to said circuit means for receiving said control signal therefrom, said control means adapted to vary the adjustable means in response both to changes in the number of seeds actually planted and to variations in the rate of sensing said second signals from said distance measuring means, whereby a desired density of seed population is maintained in accordance with the setting of said selector means.

6. The control system according to claim 5, wherein said circuit means includes up-down counter circuit means, a first circuit portion thereof receiving said first signal and a second circuit portion thereof receiving said second signal, and said control signal being substantially in accordance with the setting of said selector means until such time as a difference signal exists between said updown counter circuit means and said selector means.

7. The control system according to claim 5, further including stop circuit means for detecting the absence of said second signal, said stop circuit means being coupled to said circuit means for stopping operation of said variable speed drive means to cease further dispensing of seeds when the vehicle is stopped.

* * * * *

UNITED STATES PATENT OFFICE
CERTIFICATE OF CORRECTION

Patent No. 3,855,953        Dated DECEMBER 24, 1974

Inventor(s) GEORGE H. FATHAUER and WESLEY J. BACHMAN

It is certified that error appears in the above-identified patent and that said Letters Patent are hereby corrected as shown below:

Col. 6, line 39, "adaptable" should be --adjustable--

Signed and sealed this 8th day of April 1975.

(SEAL)
Attest:

RUTH C. MASON
Attesting Officer

C. MARSHALL DANN
Commissioner of Patents
and Trademarks